(12) United States Patent
Wilkinson et al.

(10) Patent No.: US 6,904,095 B1
(45) Date of Patent: Jun. 7, 2005

(54) DIGITAL SIGNAL PROCESSING AND SIGNAL FORMAT

(75) Inventors: James Hedley Wilkinson, Tadley (GB); Stephen Charles Olday, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 0 days.

(21) Appl. No.: 09/410,504

(22) Filed: Oct. 1, 1999

(30) Foreign Application Priority Data

Oct. 2, 1999 (GB) .............................. 9821518

(51) Int. Cl.[7] .......................... H04N 7/12; H04N 11/02
(52) U.S. Cl. .............................. 375/240.26; 375/240.28
(58) Field of Search ............................... 370/458, 503, 370/516, 517, 451; 348/518, 464, 467, 461, 497; 375/240.01, 240.12, 240.26, 240.28

(56) References Cited

U.S. PATENT DOCUMENTS

| | | | |
|---|---|---|---|
| 5,381,181 A | * 1/1995 | Deiss ...................... | 348/423.1 |
| 5,467,342 A | 11/1995 | Logston et al. | |
| 5,533,021 A | 7/1996 | Branstad et al. | |
| 5,640,388 A | 6/1997 | Woodhead et al. | |
| 5,699,392 A | 12/1997 | Dokic | |
| 5,781,599 A | * 7/1998 | Shiga ....................... | 375/376 |
| 5,966,385 A | * 10/1999 | Fujii et al. .................. | 370/465 |
| 5,966,387 A | * 10/1999 | Cloutier ..................... | 370/516 |
| 6,141,358 A | * 10/2000 | Hurst et al. ................. | 370/543 |
| 6,157,674 A | * 12/2000 | Oda et al. ................... | 375/240 |
| 6,169,843 B1 | * 1/2001 | Lenihan et al. ............... | 386/46 |
| 6,195,392 B1 | * 2/2001 | O'Grady ................. | 375/240.28 |
| 6,233,251 B1 | * 5/2001 | Kurobe et al. .............. | 370/471 |
| 6,278,710 B1 | * 8/2001 | Eidson ....................... | 370/394 |
| 6,356,567 B2 | * 3/2002 | Anderson et al. ........... | 370/516 |

FOREIGN PATENT DOCUMENTS

| | | |
|---|---|---|
| EP | 0 059 821 | 9/1982 |
| EP | 0 624 983 | 11/1994 |
| WO | WO 96/02098 | 1/1996 |

OTHER PUBLICATIONS

Wilkinson J H : "Packetised stream formats for the SDTI" IEE Colloquium on the EBU–SMPTE Task Force: Building an Infrastructure for Managing Compressed Video Systems (Ref. No. 1997/382) IEE Colloquium on the EBU–SMPTE Task Force: Building an Infrastructure for Managing Compressed Video Systems (Ref. No. 1997, 1997, pp. 10/1–10/7, XP002236729 1997, London, UK, IEE, UK.

* cited by examiner

*Primary Examiner*—Chris Kelley
*Assistant Examiner*—Dave Czekaj
(74) *Attorney, Agent, or Firm*—Frommer Lawrence & Haug LLP; William S. Frommer; Samuel S. Lee (57) ABSTRACT

A digital signal comprises data blocks. Each data block includes a header containing data relating to the block and a plurality of slots. Each slot has a slot header relating to the slot and a data packet. A plurality of data packets contains at least a first part and subsequent parts of the digital signal. A first slot includes the first part of the digital signal and a reference time defining a time of production of the first part. Each subsequent slot contains a subsequent part of the digital signal and timing information defining a time of production of the subsequent part relative to the reference time.

39 Claims, 7 Drawing Sheets

Fig. 1 : Format of the SDTI-TS Fixed Block

Fig. 2a : MPEG-2 Transport Stream Packet

Fig. 2b : MPEG-2 Transport Stream Packet with Active 16 bytes FEC

Fig. 2c : MPEG-2 Transport Stream Packet with Null FEC Space

Fig. 3: TS Payload Structure

Fig. 4 : Payload Header Structure

Fig. 5 : SDTI-TS Timing Reconstruction

Fig. 7

Fig. 10 : Format of the SDTI Variable Block

Fig. 11 : TLD Block

Fig. 12 : Hierarchy of SDTI Variable Blocks and TLD Blocks

Fig. 13 : TLD Compound Packet With All Components

DIGITAL SIGNAL PROCESSING AND SIGNAL FORMAT

BACKGROUND OF THE INVENTION

Field of the Invention

The present invention relates to signal processors and to a signal format. In particular the invention relates to a signal format, a signal encoder for encoding a signal according to the format, a corresponding decoder, and a signal transmission system including the encoder and decoder.

It is desired to transmit packetised signals such as MPEG 2 TS (Transport Stream) packets from one location or piece of equipment to another. It is known to transmit MPEG 2 TS packets via a DVB Asynchronous Serial Interface (ASI). DVB ASI is effective for the transmission of one transport stream from point to point such as between specific items of equipment but is otherwise relatively inflexible.

According to one aspect of the invention, there is provided a transmission system in which MPEG 2 TS packets are transmitted via an SDTI system.

Such a system provides greater flexibility than using DVB ASI. The SDTI (Serial Data Transport Interface) is defined in SMPTE 305M. SDTI transmits packets in a signal structure comprising frames of television lines. Ancillary data is carried in the horizontal blanking area of lines and data is carried in a payload area of each line. The payload area is in the active line interval. SDTI allows TS packets to be routed wherever SDI connections are available and also allows TS packets from more than one source to be transmitted. However, the carriage of TS packets over SDTI requires buffering to ensure that the packets are confined to the payload area of the SDTI and to allow multiple packets on each line for efficiency. The buffering process introduces delay and jitter (i.e. variation in the timing of the packets relative to each other) to the packets but, for accurate decoding of an MPEG 2 signal, the packets of that signal must be provided to the MPEG decoder with accurate timing relative to one another to allow correct decoding. Whilst absolute delay of packets is not a problem because it affects all packets equally, there is a need to correct jitter at or before the MPEG decoder.

Whilst the foregoing discussion describes the technical problem faced by the present invention with reference to the transmission of MPEG 2 TS packets via SDTI, similar problems may occur in the transmission of other types of time sensitive packets over other data transmission systems.

SUMMARY OF THE INVENTION

According to another aspect of the invention, there is provided a digital signal comprising: data blocks, each data block including a header containing data relating to the block and at least one slot; each slot having a slot header relating to the slot and a data packet; the data packets containing successive parts of information from a source; a first slot which contains a first packet containing a first part of the said information from the source also containing a reference time; and the or each subsequent slot containing a subsequent packet of the information from the said source also containing timing information defining the timing of that packet relative to the reference time.

According to another aspect of the invention, there is provided an encoder for encoding a digital signal comprising data blocks, each data block including a header containing data relating to the block and at least one slot; each slot having a slot header relating to the slot and a data packet; the data packets containing successive parts of information from a source; a first slot which contains a first packet containing a first part of the said information from the source also containing a reference time; and the or each subsequent slot containing a subsequent packet of the information from the said source also containing timing information defining the timing of that packet relative to the reference time, the encoder comprising a clock, and means for deriving from the clock a reference time defining the time of production of the said first packet and for providing the reference time information in the said first slot and for deriving from the clock the said timing information defining the times of production of the subsequent packages and providing the timing information in the subsequent slots as the subsequent packets are produced.

According to a further aspect of the invention, there is provided a decoder for decoding a digital signal comprising data blocks, each data block including a header containing data relating to the block and at least one slot; each slot having a slot header relating to the slot and a data packet; the data packets containing successive parts of information from a source; a first slot which contains a first packet containing a first part of the said information from the source also containing a reference time; and the or each subsequent slot containing a subsequent packet of the information from the said source also containing timing information defining the timing of that packet relative to the reference time, the decoder comprising a clock, means for detecting the timing information of the packets, means for initially setting the clock to the said reference time on detection of the said first packet, means for comparing the clock time with the said timing information of the subsequent packets, and means for outputting the packets at the times when the timing information of the packets equals the clock time.

By providing the timing information in the signal, the decoder is enabled to output the packets with jitter substantially reduced and preferably eliminated to allow correct decoding in for example a subsequent MPEG decoder if the packets are MPEG TS packets. Packet jitter can corrupt the decoding. The decoder compares the timing information of each packet with an internal clock set by the reference time of the first packet and outputs the packets to, for example, a buffer when the clock time equals the packet time thus at least reducing the jitter.

In an embodiment of the invention, the blocks are payload areas in the active line intervals of SDTI signals which have ancillary data including address data in the non-active areas of the lines.

In an embodiment of the present invention as applied to SDTI, there is a fixed, integer, number of complete packets per SDTI line with padding (e.g. zeros) in any unused space. The slot lengths are thus fixed. The slots and packets on a particular SDTI line all have the same source and destination addresses and there is only one packet stream on that line.

In another embodiment of the present invention as applied to SDTI, the data blocks are variable length blocks which may occupy one or more lines. The slots within the variable length data blocks are variable length slots. Preferably, the slots are "T L D blocks" containing a Type field T containing data describing the type of data in the Data field D and a Length Field L defining the length of the data in the data field. Preferably the TLD blocks are of two types: metadata blocks; and data blocks. A metadata TLD block precedes the data TLD block(s) containing the data described by the metadata. The TLD data blocks contain the reference time and timing information. The metadata TLD block preceding those blocks contains data identifying which of the blocks contains the reference time.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

For convenience, the Figures represent the data in parallel-format. In practice the data is transmitted in serial-format.

Overview

First Embodiments

SDTI-TS

The following description describes first examples of a novel signal format for carrying MPEG-2 Transport Stream packets over the SDTI (SMPTE 305M). MPEG 2 TS and SDTI are well known and will not be described herein in detail. The novel format is referred to herein as SDTI TS. SDTI uses television lines to carry data. The active line intervals are the pay load areas and contain the STDI data blocks. The non-active intervals of the lines contain ancillary data including the source and destination addresses of the data in the active line intervals. In accordance with an embodiment of the present invention, to ensure efficiency of transfer, the pay load area of each line of SDTI-TS is filled to capacity as much as possible with whole, fixed length, slots containing the packets from one Transport Stream. The novel format includes all information necessary to recover Transport Stream packets with a low jitter level at the SDTI-TS decoder and has the flexibility to meet a number of design requirements.

References

The following references, which are published standards, contain information relevant to the present invention.

SMPTE 305M, Serial Data Transport Interface (SDTI).

SMPTE RP 168, Definition of Vertical Interval Switching Point.

ISO/IEC 13818-2: Information Technology—Generic Coding of Moving Pictures and Associated Audio Information: Video, (MPEG-2).

ISO/IEC 13818-2: Information Technology—Generic Coding of Moving Pictures and Associated Audio Information: Systems, (MPEG-2).

DVB: Interfaces for CATV/SMATV Headends and Similar Professional Equipment;

Asynchronous Serial Interface (ASI).

SMPTE 259M, 10-bit 4:2:2 Component and 4fsc NTSC Composite Digital Signals/Serial Interface.

SMPTE 291 M, Ancillary Data Packet and Space Formatting.

Background

The currently established interface for the carriage of MPEG-2 Transport Stream (TS) packets is the DVB ASI which places packets within a small tolerance of the position required to ensure minimal impact on the decoder buffer. However, ASI cannot easily carry more than one TS, neither can ASI be supported by commonly available SDI based equipment. It is useful as a specialised point-to-point interface between specific items of equipment.

Illustrative Examples of the Present Invention

One aspect of the present invention proposes the carriage of MPEG2 TS packets over the SDTI. This allows a more general approach to connectivity by allowing TS packets to be routed wherever SDI connections are available. However, the carriage of TS packets over the SDTI requires buffering to ensure that packets are confined to the payload area of the SDTI and to allow multiple TS packets on each line for efficiency. The result of this buffering process is to introduce both a delay and jitter to the packet stream. The delay is not a problem which concerns the present invention. The examples of the present invention described herein allow the packet jitter to be reduced to insignificant levels. As a benchmark, the present embodiments allow a DVB-ASI input to be carried through SDTI-TS and decoded to create a new DVB-ASI signal with minimum additional jitter. The SDTI-TS can also operate directly from other interface points as required.

SDTI Parameters

Figure 1:
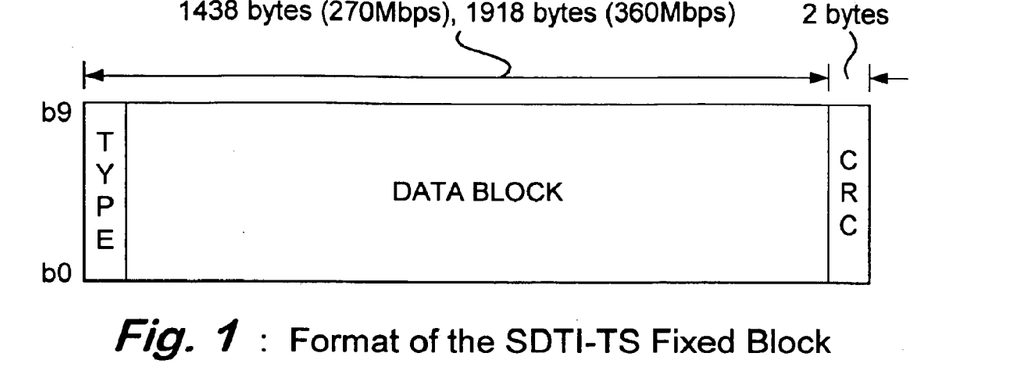
FIG. 1 is a schematic diagram of the payload area of an SDTI line.

SMPTE 305M specifies the SDTI for bit rates of 270 Mbps and 360 Mbps and examples of the invention may operate on both bit rates and at higher bit rates. The examples of SDTI-TS described herein use the fixed block size mode of the SDTI with one block per line. The format of each fixed length block is shown in FIG. 1. The block is either 1438 or 1918 bytes long including a ten bit SDTI-TYPE word as described hereinafter. The block typically includes an additional 2 bytes of error detection CRC for a total of 1440 or 1920 bytes as shown in FIG. 1.

Type Word

The SDTI data block has a block type word.

For 270 Mbps SDTI, the Block Type value is "01h" which specifies a block size of 1438 words per line (including the Type value).

For 360 Mbps SDTI, the Block Type value is "09h" which specifies a block size of 1918 words per line (including the Type value).

The SDTI Data Type word has a suitable value: there is no assigned value at present.

The input format is 8 bit data entered into bits b7–b0 of a 10 bit word. Bit b8 of the 10 bit word is the even parity of bits b7–b0 and bit b9 is the complement of bit b8.

The optional FEC (Forward Error Correction) may be added to the block to give added data security. Whether FEC is added or not, bits b7 and b6 of the Block Type word are set according to SMPTE 305M.

Figure 2A:
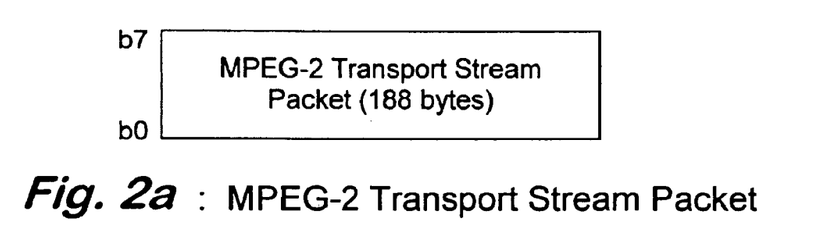
FIGS. 2a to c are schematic diagrams of MPEG 2 TS packets.
Figure 2B:
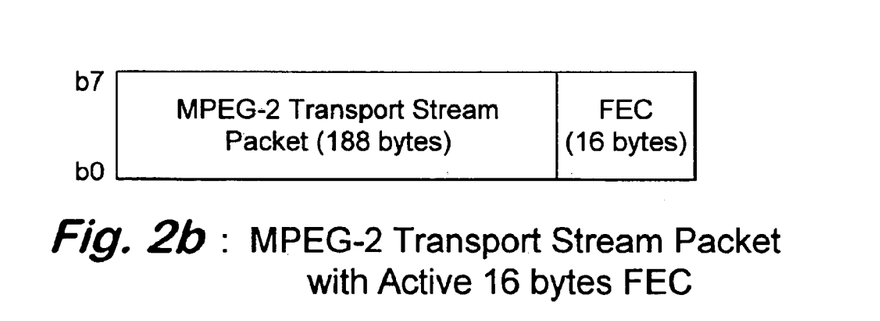

The present examples of the invention do not use the Data Extension facility of SMPTE 305M. It is recommended to avoid use of the SDI switching lines as defined in SMPTE-RP 168 MPEG-2 TRANSPORT STREAMS As shown in FIG. 2a, MPEG-2 TS (Transport Stream) packets are 188 bytes in length. As shown in FIG. 2b if DVB Forward Error Correction (FEC) is added, then the packet length is 204 bytes. The MPEG-2 TS FEC is interleaved across packets and designed for correcting serious data loss through transmission errors which may be bursty. Whilst in extreme cases SDTI can create occasional errors, the MPEG-TS FEC is unsuitable for correcting SDTI errors due to the interleave length and this FEC will not exist if the packets carried are only 188 bytes in length. Consequently, the SDTI-TS format of an embodiment of the invention includes an optional FEC to correct for any errors which may occur through the SDTI link.

Payload Format

Figure 3:
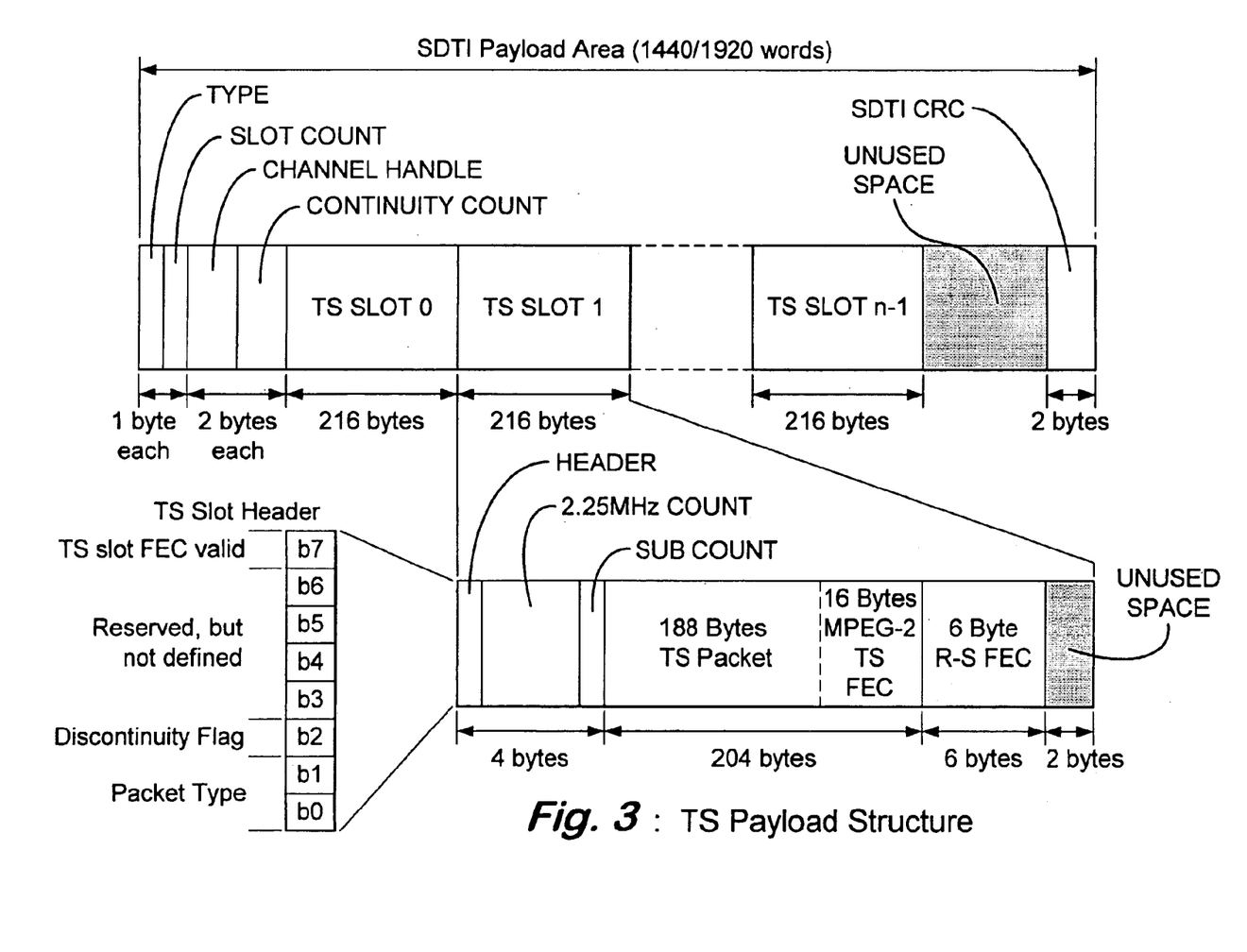
FIG. 3 is a schematic diagram of an SDTI payload area divided into slots and having a format in accordance with an embodiment of the present invention.

In accordance with the first embodiments of the invention, the MPEG-2 TS packets are wholly contained in an SDTI fixed block placed in a TS Payload format an example of which is described as follows with reference to FIG. 3. The illustrative TS Payload format has a 2 layer structure as indicated in FIG. 3. The payload has a TS Payload header defining parameters which apply to the whole payload line, and a fixed number of TS Slots into which the MPEG2 TS packets are placed. Each TS Slot has a slot header which defines parameters associated with the TS packet in the slot, followed by the TS packet itself and terminated by an optional SDTI RS-FEC of 6 bytes.

TS Payload Structure

Figure 4:
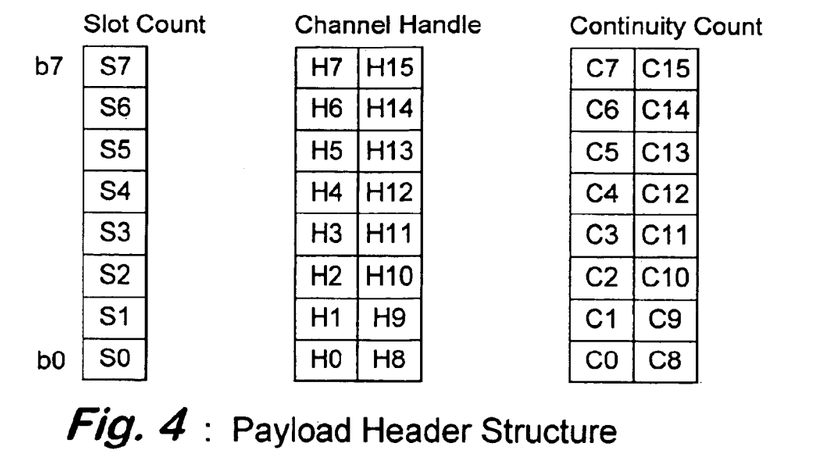
FIG. 4 is a schematic diagram of the payload header structure.

The SDTI Type word of the TS Payload is the type word at the left hand side of FIG. 1. The bit assignments of the Slot Count, Channel Handle and Continuity Count words are shown in FIG. 4.

TS Payload Slot Count

The Slot Count is an 8 bit word which defines the number of TS Slots for this Payload line. The number of TS Slots has a lower value of 1 and an upper value defined by the payload length. In the case of 270 Mbps SDTI, the maximum number of TS Slots is 6. In the case of 360 Mbps SDTI, the maximum number of TS Slots is 8. Higher SDTI rates can support appropriately higher numbers of TS Slots in the payload area. In the present embodiments of the invention, data space between the last TS Payload Slot and the SDTI CRC words is not used for any other purpose or application. Lower values of payload slot count tend to reduce the codec delay. Further information on this topic is given herein below.

TS Payload Channel Handle

The Channel Handle is a 16 bit word organised as two 8 bit words with the most significant word first. This word is used to distinguish between TS Payload lines having the same SDTI source and destination header addresses but representing different channels of TS transmission. In the present embodiments the Channel Handle value is set to "0000h" but other values may be chosen.

TS Payload Continuity Count

The "Continuity Count" is a modulo 65536 count which increments by 1 for every TS Payload line having the same SDTI Source and Destination addresses and the same Channel Handle value. The purpose of this count is to provide detection of signal path switching.

TS Slot Structure

In the present embodiments every TS Slot is 216 words in length and TS Slots are arranged in continuous order immediately following the TS payload header. A TS Slot contains information in the following sequence:

a TS Slot header of 2 word length, a coarse count value of 2 words in length clocked at 2.25 MHz, a fine count which is one word in length clocked at a multiple of 2.25 MHz, a 188 byte TS Packet, a 16 byte space for the optional MPEG-2 TS FEC, a 6 byte space for the optional SDTI-TS FEC, and a 2 byte null data space.

TS Slot Header

The TS Slot header is an 8 bit word with bits b7–b0 defined as follows:

Bit b7 defines whether the TS Slot has an active SDTI FEC.

b7 is "0" if the SDTI FEC is not active and is "1" if the SDTI FEC is active.

Bits b6–b3 are reserved but not defined.

Bit b2 is a TS discontinuity flag. If the TS packet in this TS slot is not related to the previous TS packet, the b2 is set to "1", else it is set to "0". A discontinuous TS packet (i.e. b2='1') also indicates that this is the first packet in a new TS packet sequence.

Bits b1 and b0 form a code which define the TS packet type as follows:

| b1 | b2 | TS Type |
|----|----|---------|
| 0 | 0 | 188 byte TS packet with no 16 byte FEC. |
| 0 | 1 | Reserved but not defined. |
| 1 | 0 | 204 byte TS packet with an inactive 16 byte FEC |
| 1 | 1 | 204 byte TS packet with an active 16 byte FEC. |

TS Slot Coarse Count

The coarse count value is derived from a modulo 65536 counter clocked at 2.25 MHz at the SDTI-TS encoding point and defines the coarse timing of the TS packet for the decoder to be able to output the TS packet at the correct time relative to the previous TS packet. This coarse timing is used in conjunction with the next word, the TS Slot sub count which contains a fine timing derived from a clock at an integer multiple of 2.25 MHz to provide a clock with a reference timing close to that of the TS Program Clock Reference (PCR). The coarse and fine timing are preferably derived from the same master clock which is for example the PRC clock operating at 27 MHz.

It is not required for the 2.25 MHz counter to match the period of the PCR of 27 hours. The 2.25 MHz counter only needs a sufficient cycle period guaranteed to be longer than the maximum period between TS packets. The 2.25 MHz cycle period is approximately 30 msecs. The 2.25 MHz counter increments by 1 for every 12 increments of the PCR.

TS Slot Sub Count

In the case of 270 Mbps SDTI, the sub count is clocked by a 27 MHz clock (which is at the same rate as the PCR) and counts over the range 0 to 11. In the case of 360 Mbps SDTI, the sub count is clocked by a 36 MHz clock (which is at a higher rate than the PCR) and counts over the range 0 to 15. The number of bits available for the Sub Count value allows SDI word (parallel) clock rates up to 576 MHz. How the TS Slot counts can be used for output timing control is described herein later.

TS Packet Data

The 204 byte space for the TS packet is a fixed allocation. The contents of this space are filled with 188 byte or 204 byte TS packet data as defined by bits b1 and b0 of the TS slot header word. In the cases of 188 byte TS packets and of 204 byte TS packets with inactive TS FEC, the 16 byte TS FEC space is null filled.

TS Slot RS FEC

The FEC is applied over the 214 bytes of the TS slot from the 2.25 MHz count word to the last word of the FEC. If the TS slot header word FEC valid bit (b7) is set to "0", then all 6 words of the FEC are set to "00h". The FEC is a Reed-Solomon, R-S(214, 208, T=3) shortened code from the original R-S(255, 249, T=3) code.

The R-S code generator polynomial is:

$$R\text{-}S(x) = (x \oplus \alpha^0) \cdot (x \oplus \alpha^1) \cdot (x \oplus \alpha^2) \cdot (x \oplus \alpha^3) \cdot (x \oplus \alpha^4) \cdot (x \oplus \alpha^5)$$

where α is defined by Galois Field GF(256) generator polynomial:

$$GF(x) = x^8 \oplus x^4 \oplus x^3 \oplus x^2 \oplus 1.$$

TS Slot Null Space

The TS slot ends with 2 words of zero filled null space.

Using the TS Slot Timing Data

Figure 5:
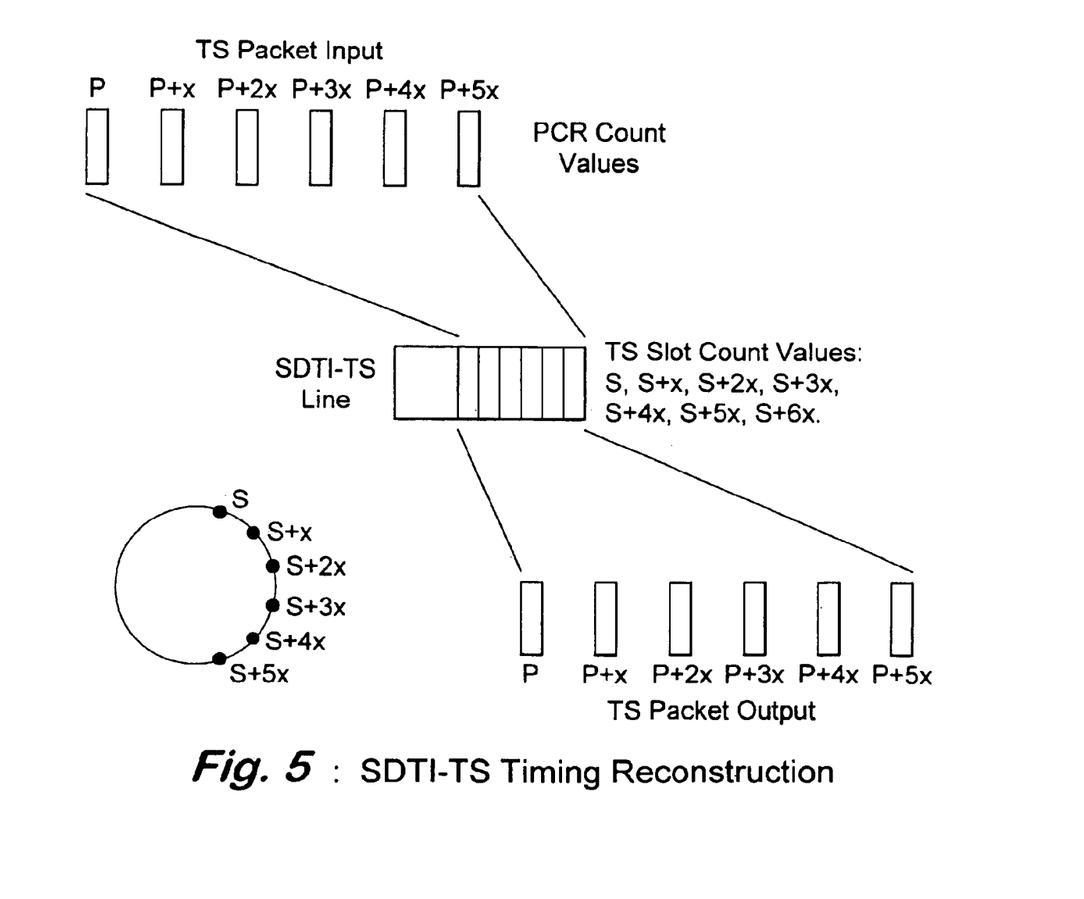
FIG. 5 is a schematic diagram illustrating the correction of jitter in accordance with an embodiment of the present invention.

FIG. 5 illustrates the SDTI-TS coding process from the MPEG-2 TS packet stream input to output through the SDTI-TS format The combination of the TS Slot 2.25 MHz count and the sub count values defines a count value with a resolution at least as high as the PCR and with a period before repetition of approximately 30 msecs. On reception of the first TS packet in a sequence, the decoder may output the packet whenever it is ready and, at the same time, sets an internal counter running at the SDTI word rate (27/36 MHz) to the TS slot count value. This counter counts in the same manner as defined for the 2.25 MHz count and sub count. Thereafter, for all remaining packets, the decoder outputs a packet when the decoder counter equals the counter stored in the TS slot count thus guaranteeing the integrity of the output TS packet timing. In the case of 270 Mbps SDTI, the count value clocks at the same rate as the TS packet PCR and should result in no timing jitter. In the case of 360 Mbps SDTI, the count increments by 4 for every 3 increments of the TS packet PCR, therefore, resulting in plus or minus 1 PCR clock jitter. This value is well within the MPEG-2 defined limits.

System Delay Considerations

The payload area of each SDTI line is packed with as many complete slots and thus TS packets as possible. In the present embodiments the slots are of fixed length and the SDTI payload area contains only complete slots. Spare space in a payload area is filled with zeros. This ensures that the waste of SDTI lines is minimised and thus the maximum number of lines are available for the transfer of other data. The following examples are based on 270 Mbps SDTI-TS. At a bit rate of 4 Mbps, approximately 15 lines per frame (525/30) are used for the carriage of MPEG-2 TS packets and the codec delay is just over 2 msec. At a bit rate of 50 Mbps, approximately 185 lines per frame (525/30) are used for the carriage of MPEG-2 TS packets and the codec delay is thus reduced to around 200 usec. To a first approximation, the codec delay is inversely proportional to the bit rate. Thus at low bit rates, delay can only be reduced by reducing the number of TS packets per line and thus occupying proportionately more SDTI lines. If the 4 Mbps example above occupied only 1 TS packet per line, then the delay would be reduced to approximately 400 usec.

Example of an SDTI TS system

Figure 2C:
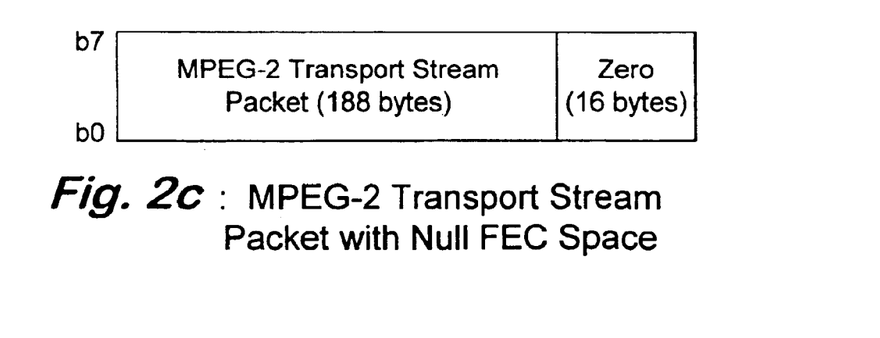
Figure 6:
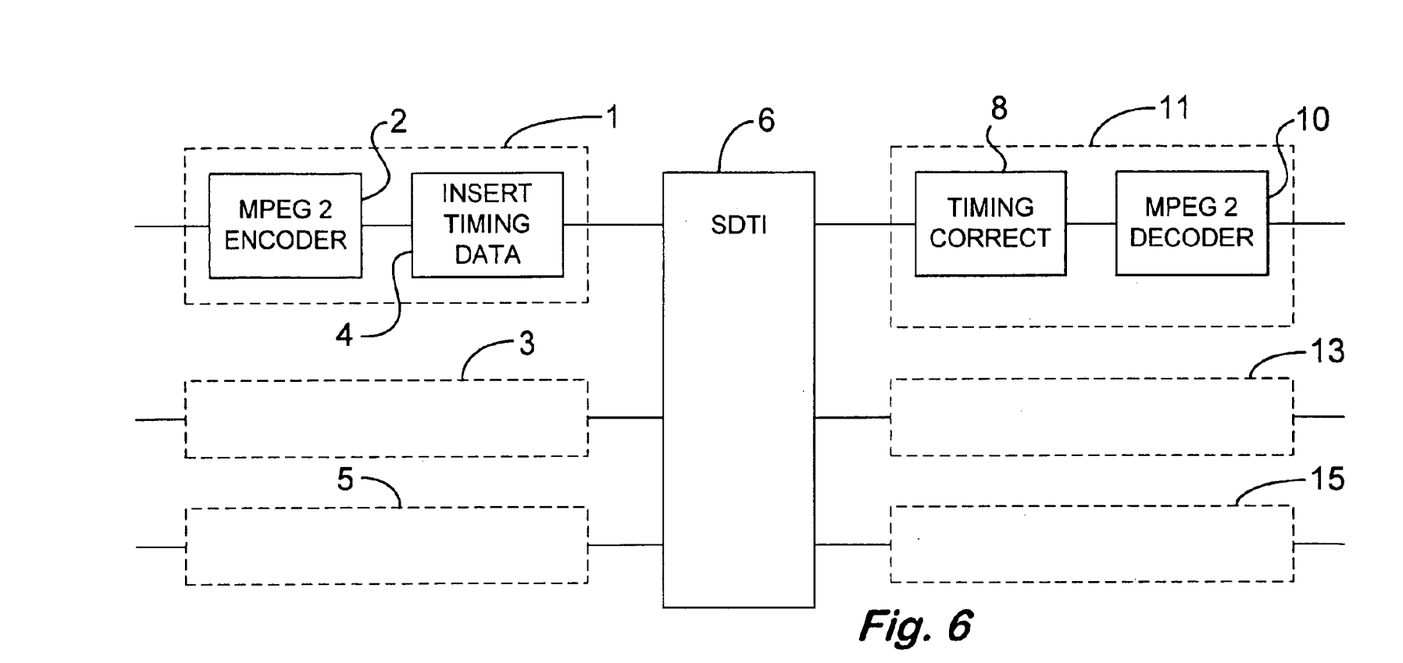
FIG. 6 is a schematic block diagram of a system, in accordance with an embodiment of the invention for transmitting MPEG 2 TS packets over an SDTI system.

Referring to FIG. 6 there is shown an example of an SDTI TS system. The system comprises a data source 1. The data source I includes an MPEG2 encoder 2 which is known and which produces known MPEG 2 TS packets. The packets may or may not include the FEC data, as shown in FIGS. 2a to 2c. The packets are outputted from the MPEG encoder with the correct relative timing: i.e. they are relatively jitter-free. A timing data inserter 4 of the source 1 (and described in more detail with reference to FIGS. 7 and 8) inserts the coarse and fine timing data into a header. The timing data defines the correct timing of the packets relative to a reference time. The MPEG2 TS packets with the timing data are fed to the SDTI 6. The SDTI 6 also receives packets and other data from other sources 3 and 5. The other sources may or may not be the same as source 1. The SDTI routes the data from the sources 1, 3 and 5 in known manner to respective corresponding destinations 11, 13 and 15. For that purpose one SDTI line has a source address and a destination address in its ancillary data and carries only data from the addressed source to the addressed destination. As described above the MPEG2 TS packets are buffered in the SDTI so that they incur jitter. At the destination 11 the packets from source 1 are subject to timing correction in corrector 8 before delivery to an MPEG decoder with the correct timing. An example of the corrector 8 is described with reference to FIG. 7.

The SDTI assembles the MPEG2 TS packets into the slots shown in FIG. 3 adding the slot header data to the timing data and adding the block header data, as also shown in FIG. 3, to the block. The SDTI also adds the 6 byte FEC, the zeros for the null space and the optional SDTI CRC. The SDTI also determines when a packet is the first packet of a new packet sequence and sets the bit b2 of the TS discontinuity flag to '1'.

Figure 7:
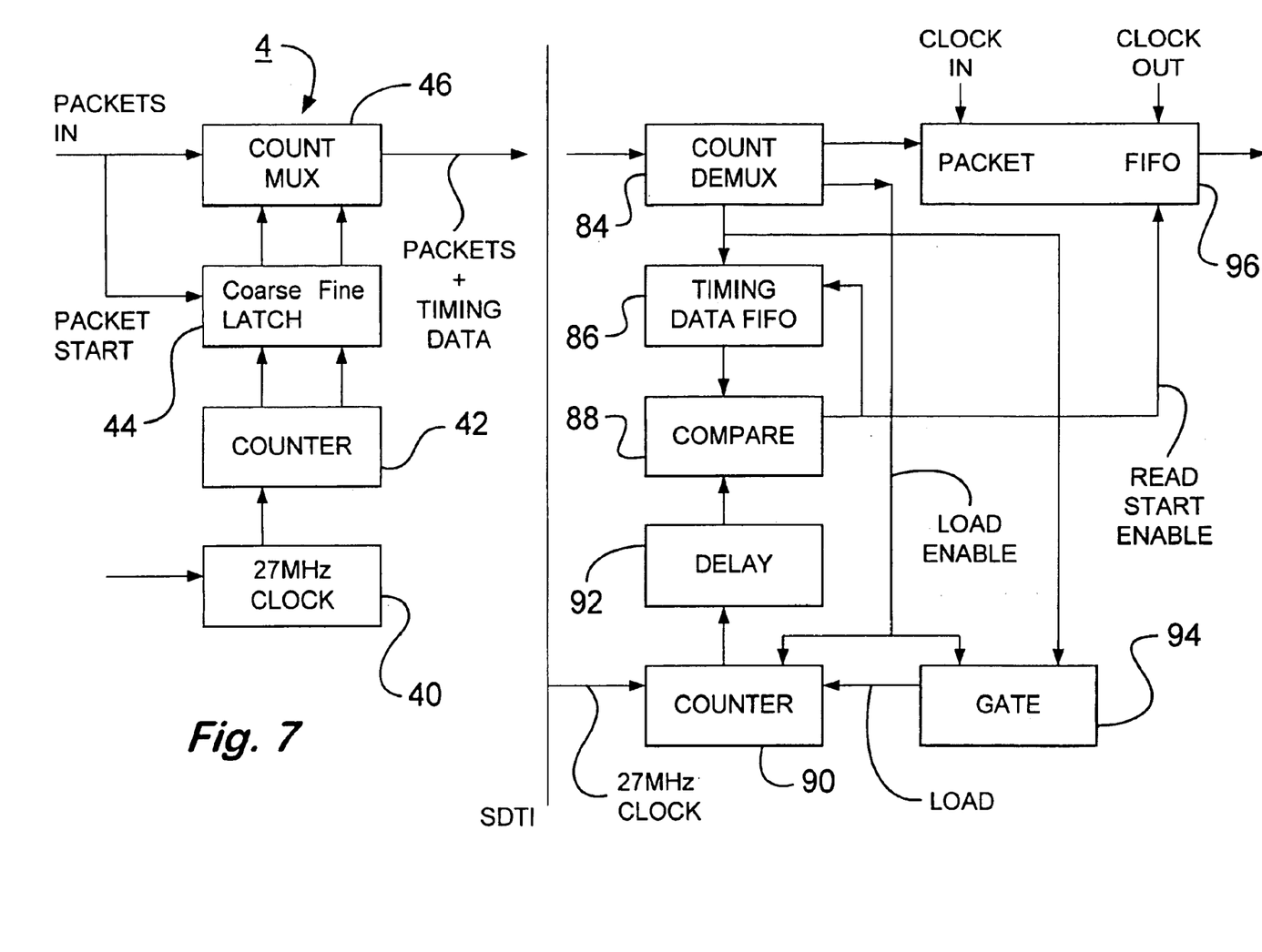
FIG. 7 is a schematic block diagram of an example of the timing data inserter and of the timing corrector of the system of FIG. 7.
Figure 8:
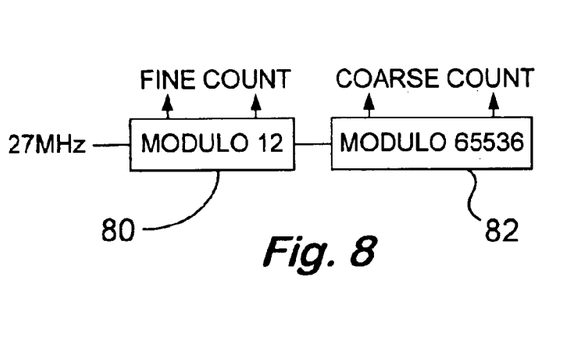
FIGS. 8 and 9 are schematic block diagrams of examples of the counters of FIG. 7.

Referring to FIG. 7, an example of the timing data inserter comprises a 27 MHz clock 40 which clocks a counter 42 to produce the timing data. The clock 40 is derived from the SDTI clock. An example of the counter is shown in FIG. 8. The counter comprises a Modulo 12 counter 80 clocked at 27 MHz which produces the fine timing data and which produces a 2.25 MHz clock for clocking a Modulo 65536 counter 82 which produces the coarse timing data. The counters 80 and 82 are free running. A latch 44 temporarily stores the fine and coarse counts. Upon receiving a packet start signal it feeds the current counts to a multiplexer 46 which inserts the timing data into the bit stream at the start of the packet. The first packet of a packet sequence is allotted whatever arbitrary time is indicated by the counter 42 at the moment of its production. That time is a reference time for the subsequent packets of the sequence. The coarse counter 82 sequences through its counts with period of $65536/(2.25*10^6)$ seconds or about 30 ms.

At the destination, an example of the corrector 8 comprises a demultiplexer 84 which detects the slot header and determines therefrom whether a packet is the first in a sequence as indicated by the discontinuity flag (b2=1) and the fine and coarse timing data. The demultiplexer separates the MPEG2 TS packet from the slot header and feeds the packet to a FIFO buffer 96. The FIFO buffer 96 stores one SDTI block of packets. The packets are on average clocked into and out of the FIFO at the same rate e.g. 270 M bits per second as they are originally produced at the source 1. However, the packets may be input irregularly but are output continuously with correct timing. The demultiplexer feeds the timing data to a comparator 88 via another FIFO 86 and directly to a gate 94. If the packet is a first packet, the discontinuity flag b2=1 enables the gate 94 to load the timing data, which represents the reference time, into the counter 90, thereby setting the counter to the reference time.

Figure 9:
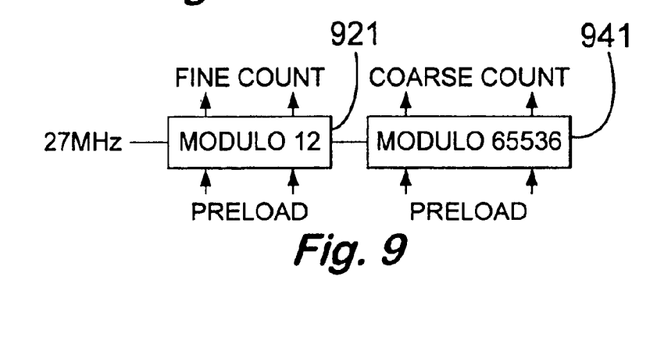

The counter 90 an example of which is shown in FIG. 9 comprises a modulo 12 counter 921 and a modulo 65536 counter 941 arranged identically to the corresponding counter 80 and 82 of FIG. 8 and counting a 27 MHz clock provided by the SDTI. The clock provided by the SDTI is synchronous in known manner with the source clock 40. The counters 921 and 941 differ from the counters 80 and 82 in that they can be preloaded with the reference count. Once loaded the counters 921 and 941 are free-running in the same way as the counters 80 and 82 and are thus in delayed synchronism with them. The comparator 88 compares the timing data from the demultiplexer with the timing data from the counter 90. When the compared timing data are equal, the comparator enables the FIFO 96 to output a packet with the correct timing.

The packets and the timing data are separated by the demultiplexer 84 and fed into the FIFOs 86 and 96. The FIFOs contain corresponding sequences of packets and timing data. As the packets are moved through the FIFO 96 to its output, so are the corresponding timing data moved through the FIFO 86 to maintain correspondence with the packets in the FIFO 96. After each item of timing data reaches the output of the FIFO 86 that item is cleared from the FIFO. Each item of timing data at the output of the FIFO 86 is compared with the count in the counter 90 and when the count represented by the timing data equals the count in the counter, a read out enable signal causes the FIFO 96 to start reading out the corresponding packet which accordingly has the correct timing. The enable signal also clears the timing data from the output of the FIFO 86 and moves the next item of timing data to the output to be compared with the count in the counter 90.

Second Embodiments

SDTI-PF

FIGS. 1 to 4 describes a signal format referred to herein as STDI-TS which uses the fixed block size mode of the SDTI will one block per line. That signal format is described in the context of transporting MPEG 2 bit streams using the SDTI. The following description describes another version of the signal format referred to herein as SDTI-PF. This format SDTI-PF allows MPEG2-TS packets to be transported and also allows for other kinds of packet to be carried over the SDTI, with or without buffering to reduce packet jitter. Such packets may be ATM cells and packets based on the Unidirectional Internet Protocol (Uni-IP).

This embodiment provides several features for the carriage of packet streams such as:

A high packing density.

A flexible arrangement of data packet types and associated packet metadata.

Carriage of multiple channels of multiple data packet types.

Provision for a powerful Forward Error Correction (FEC) specification.

The ability to reproduce accurate data packet output timing.

The ability to add embedded user information.

The control information associated with data packets can be used to:

Provide a continuity counter to detect SDI switching.

Provide a channel 'handle' for transfers of multiple channels of data packets between the same source and destination addresses.

Define the position of a data packet in a stream.

SDTI Parameters

Figure 10:
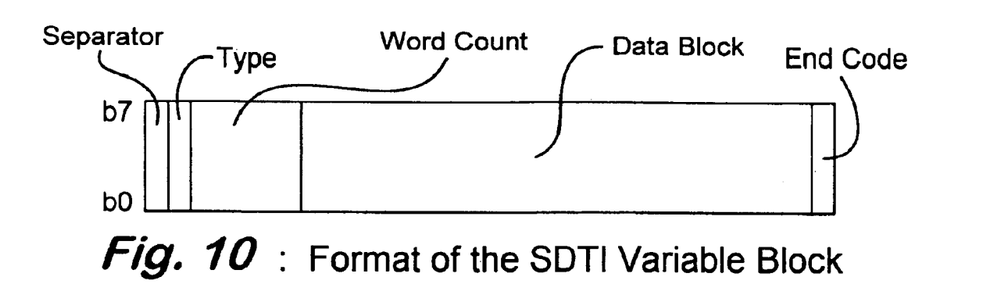
FIG. 10 is a schematic diagram of an SDTI variable block used in another embodiment of the invention.

SMPTE 305M specifies the SDTI for bit rates of 270 Mbps and 360 Mbps and this embodiment may operate on either 270 Mbps only, or on both bit rates according to the equipment specification. The SDTI-PF uses the Variable Block mode of SDTI as shown in FIG. 10. The 'Separator' and 'End Code' words are special 10 bit values defined in SMPTE 305M. All data in the space between the 'Separator' and 'End Codes' are 10 bit words where the data comprises 8 bits entered into bits b0 to b7 of the 10 bit word, bit b8 is set to even parity of bits b0 to b7, and bit b9 is set to be odd parity.

The 'Block Type' word of the SDTI header is set to Variable Block mode according to SMPTE 305M.

The SDTI Data Type word is set to the value '11h' indicating the Data packet Format (PF) variable block payload.

This embodiment does not use the Data Extension facility of SMPTE 305M.

SDTI Line and Address Numbers

Since the data in each SDTI variable block may continue through as many lines as necessary until the block end, it is necessary that the SDTI header line numbers are contiguous. It is also necessary that the SDTI header source and destination address values are constant throughout the transmission of all lines associated with any one SDTI variable block.

SDTI Switching

The arbitrary switching of SDTI data streams, although at the picture frame boundary, may affect the ability to successfully decode the contents of data packets without the use of special processing equipment to mitigate the switching effects. The lines affected by a picture switch are defined in SMPTE RP168. It is recommended to avoid the use of the lines defined by SMPTE RP168 together with the lines immediately prior to and following the switch line where transient conditions may occur. A continuity count can be provided to indicate variable blocks affected by a switch.

TLD Block Structure

Figure 11:
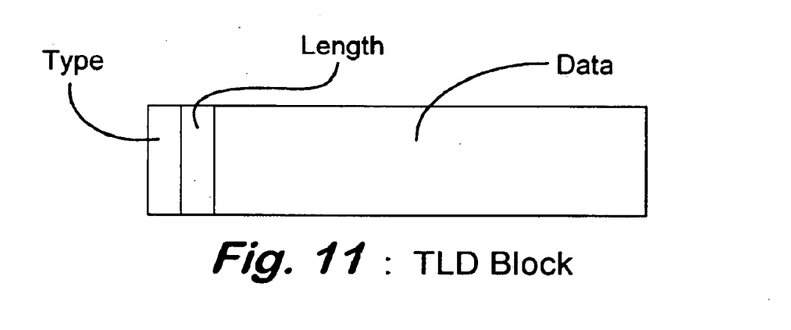
FIG. 11 is a schematic diagram of a TLD block used in the other embodiment of the invention.

The Data Block area of each variable block is filled with one or more blocks defined by a Type, Length and Data (TLD) construct as shown in FIG. 11.

The three components of the TLD construct are:

Type: the type of data contained in the 'value' area as a local 1-byte label,

Length: the length of the value, and

Data: the data as defined by the Type.

'Type' is a single byte which identifies the type of data carried in the TLD block. The Type value may identify either one kind of TLD packet (such as an MPEG-2 TS packet) or one kind of TLD metadata.

When a TLD metadata block is received, the metadata contained in the value area applies to all subsequent TLD packet blocks until either the end of the SDTI variable block or until a new TLD metadata construct of the same type is received. The data from a TLD metadata block does not carry any significance cross SDTI variable blocks, so each new variable block carries a new set of TLD metadata as needed.

Figure 12:
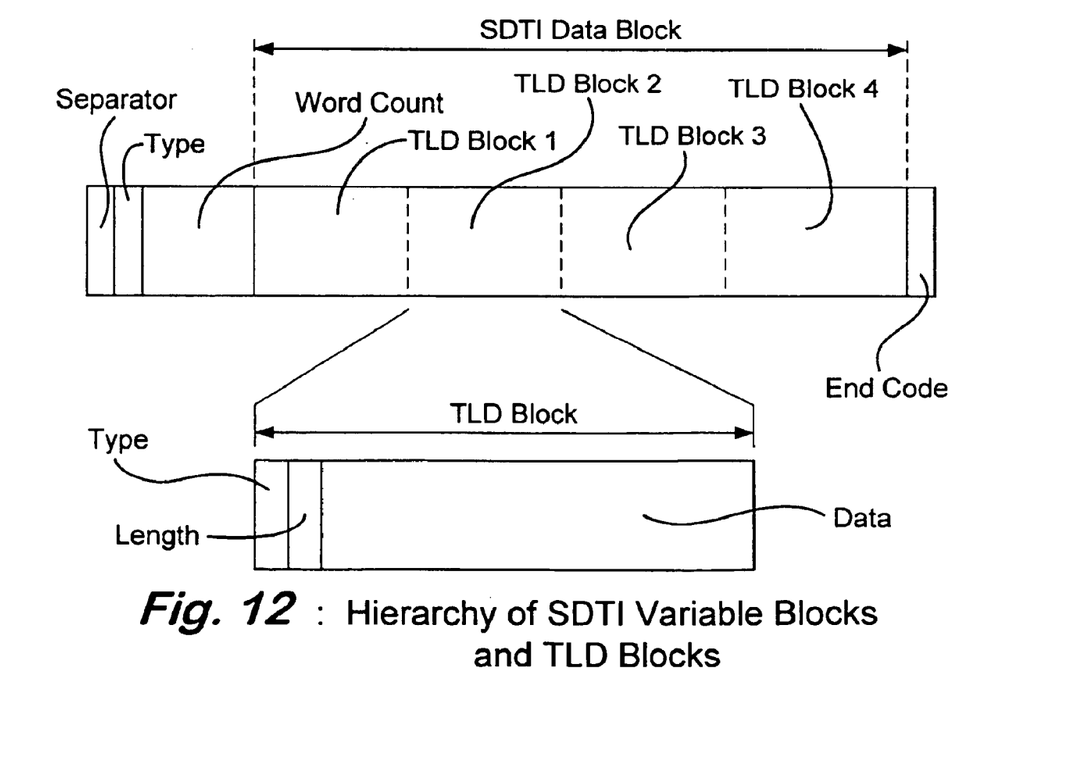
FIG. 12 is a schematic diagram showing a hierarchy of SDTI variable blocks and TLD blocks used in the other embodiment of the invention.

FIG. 12 illustrates a hierarchy of SDTI variable blocks and TLD blocks according to an embodiment of the present invention. As shown in FIG. 12 the data block area of each SDTI 'Variable Block' is wholly filled with TLD blocks. There is no padding either at the start of the SDTI 'Data Block', or between TLD blocks or between the end of the last TLD block and the SDTI 'End Code'.

TLD Type

The TLD Type is a 1 byte word used to identify the type of data in the TLD block.

The following rules apply to the assignment of Type values:

A Type value of '00h' is not used.

Type values in the range '01$h$' to '0Fh' are used to identify TLD metadata blocks.

Type values in the range from '10h' to 'FFh' use only the most significant 4 bits of the Type word to identify TLD packet types. Thus only 15 of these TLD types can be identified.

The least significant 4 bits of Type words with a value greater than '0Fh' are as follows:

Bit b3 is used to identify the presence of an FEC at the end of the TLD data area. If b3='1' then the FEC is present, else the FEC is not present and no space is allocated.

Bit b2 is used to identify if the data contains an embedded counter. If b2='1', then the embedded counter is present, else the embedded counter is not present and no space is allocated.

Bits b1 and b0 form a binary value in the range 0 to 3.

If the value='3', then 6 user bytes are contained at the head of the TLD data area.

If the value='2', then 4 user bytes are contained at the head of the TLD data area.

If the value='1', then 2 user bytes are contained at the head of the TLD data area.

If the value='0', then no user bytes are contained at the head of the TLD data area.

TLD Length

The Length of a TLD block specifies the length of the TLD Data. Thus the Length value can be used to skip to the next TLD block if needed.

The TLD Length is a variable length word defined as follows:

If the value of the first byte lies in the range '00h' to 'FEh', then the length is given by the value of the first byte.

If the value of the first byte is equal to 'FFh' then the Length value is contained in the 2 bytes which immediately follow.

Thus TLD constructs with data blocks having a length of greater than 254 bytes result in a length of 3 bytes of which the first byte is equal to the value of 'FFh' and the next two bytes contain a Length whose value may range from '0000h' to 'FFFEh'. The 2-byte Length value of 'FFFFh' is reserved for future possible expansion.

TLD Block

TLD blocks defined by a Type value up to '0Fh' contain metadata of a format defined in the Metadata Definitions below.

TLD blocks defined by a Type value above '0Fh' contain data packets as defined in the Packet Definitions below.

A Data packet may be formed from the following components:

User data of length 0, 2, 4 or 6 bytes. The length of the user data is defined by bits b0 and b1 of the Type word;

A Minor Count value in combination with a Major Count value giving 3 bytes which can be used to re-time the data packets at the decoder output with negligible jitter; and A Reed-Solomon Forward Error Correction (RS-FEC) of 6 bytes length.

Figure 13:
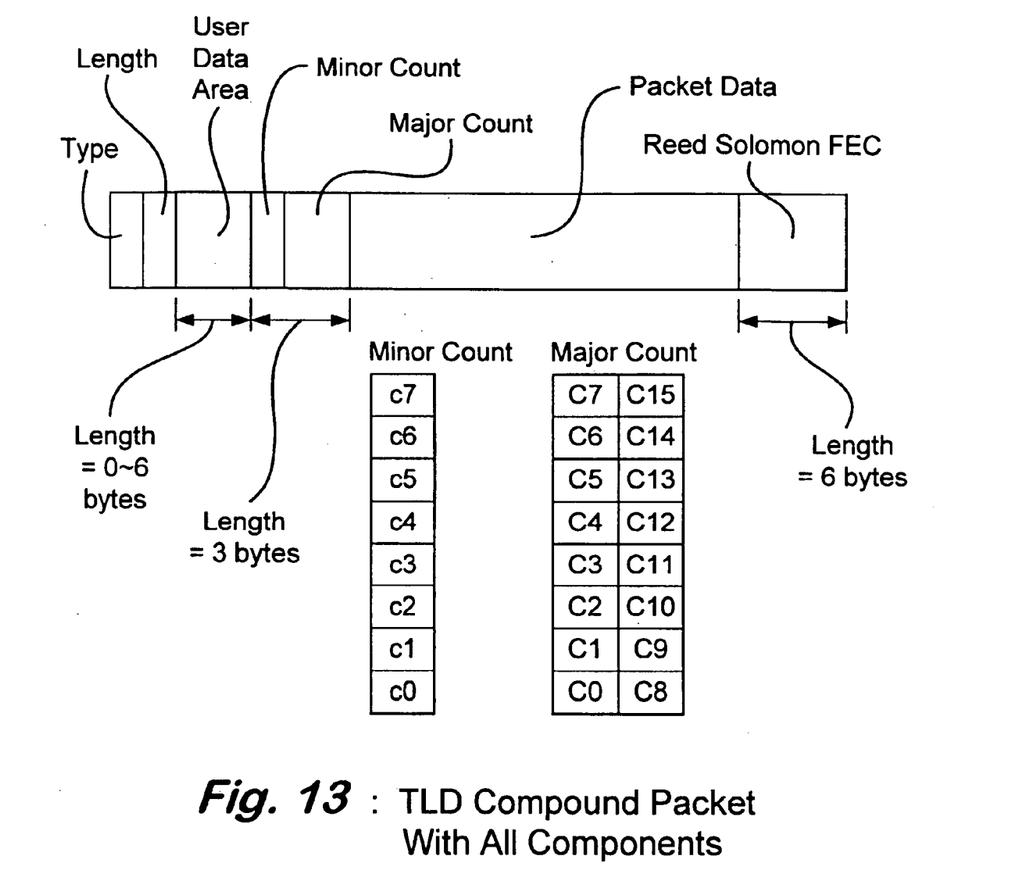
FIG. 13 is a schematic diagram of a TLD compound packet.

The TLD packet is shown in FIG. 13. At its simplest level, a data packet with a TLD Type identifier which has the 4 LSBs set to '0' becomes a simple data packet containing only the packet data and no extra components.

User Data Area

User data space is defined in increments of 2 bytes allowing 0, 2, 4 or 6 bytes of User Data area. The contents of the User Data area are private data and not defined herein.

Packet Timing Counter

The combination of Major and Minor Count values forms the Packet Timing counter with integer and fractional parts defined by the Major and Minor Count words respectively. The Packet Timing counter defines the timing of the start of each packet for a decoder to be able to output the packet at the correct time relative to the first packet in any stream. The Packet Timing counter can provide output packet start positions timings which are as accurate as the SDTI clock period.

The packet timing counter has a cycle period of approximately 30 msecs. The maximum period between packets is less than the packet timing counter cycle period to guarantee correct operation.

The description of FIGS. 5 to 9 describes how the Packet Timing counter can be used for accurate output timing control.

Minor Count

The minor count corresponds to the fine slot sub count described hereinabove.

The 8-bit Minor Count word is a value sampled from a counter clocked by the SDTI word clock. Bits c0 to c7 of the Minor Count word are used for the minor count value. Bit c0 is the least significant bit of the minor count value.

In the case of 270 Mbps SDTI, the minor count value is loaded from a counter clocked by a 27 MHz clock (which is at the same rate as the MPEG-2 TS PCR) and counting over the range 0 to 11 to create a 2.25 MHz clock period.

In the case of 360 Mbps SDTI, the minor count value is loaded from a counter clocked by a 36 MHz clock (which is at a higher rate than the MPEG-2 TS PCR) and counts over the range 0 to 15 to create a 2.25 MHz clock period.

The number of bits available in the Minor Count word allows SDTI word clock rates up to 576 MHz.

Major Count

The major count corresponds to the coarse count described hereinabove. The 16-bit Major Count word is a value sampled from a modulo 65536 counter clocked by the 2.25 MHz clock. The Major Count value is formed from bits C0 to C15 as shown in FIG. 4 representing, respectively, the LSB to the MSB of the count value.

R-S FEC

Where provided, the R-S FEC provides correction for the whole TLD structure content from the TLD Type word to the last R-S FEC word. The R-S FEC is not interleaved over multiple TLD packets. In this embodiment, the error correction is defined as a Reed-Solomon R-S (L, L-6, T=3). Where L<255, then the RS-FEC is a shortened code from the original R-S (255, 249, T=3) code.

The R-S code generator polynomial is:

$$R\text{-}S(x) = (x \oplus \alpha^0) \cdot (x \oplus \alpha^1) \cdot (x \oplus \alpha^2) \cdot (x \oplus \alpha^3) \cdot (x \oplus \alpha^4) \cdot (x \oplus \alpha^5)$$

where α is defined by Galois Field GF(256) generator polynomial:

$$GF(x) = x^8 \oplus x^4 \oplus x^3 \oplus x^2 \oplus 1.$$

Note that although the encoder provides the capability of correcting 3 errors, a decoder may choose to correct only 1 or 2 errors to preserve residual error detection performance.

Note also that the RS-FEC can only be applied to TLD structures of 255 bytes or less. Thus a TLD length value of greater than 253 will exceed the RS-FEC limit and thus is not applied.

TLD Block Definitions

The following list of definitions is that currently preferred. Extensions to this list may be made.

Each TLD, (Type, Length, Data, also referred to as Key, Length, Value) metadata definition has both a local identifier defined by the 'Type' value and a global identifier which defines the place of the metadata item in the SMPTE Dynamic Metadata Dictionary. Both identifiers are referencing the same metadata specification. The reason for the shortened Type value is for ease of parsing the data at the high speeds used by the SDTI transport. There is also a gain in packing density and hence simplified storage requirements on high speed silicon. But it should be noted that any metadata item specified in this document may be expanded to define the full K-L-V construct on which the Metadata Dictionary is based. This fully expanded K-L-V (key, length, value) construct may then be used as a basis for the common interchange of metadata items between different applications.

Metadata Definitions

Continuity Count

Local Type value '01$h$'

The Continuity Count is a 16 bit, modulo 65536 value which increments by 1 for every SDTI-PF variable block having the same SDTI Source and Destination addresses. The purpose of this count is to provide detection of signal path switching.

The bit significance is LSB first. Thus the LSB lies at bit b0 of the first byte and the MSB lies at bit b7 of the second byte.

Channel Handle

Local Type value='02h'

Length=2 bytes.

The Slot Handle is a 2 byte word which is used to distinguish between packets within a SDTI-PF variable block having the same SDTI source and destination header addresses but representing different packet channels. A Slot Handle is set to zero where all packets associated with the same SDTI Source and Destination Addresses are from a single channel. Where 2 or more channels of packet streams are multiplexed onto SDTI-PF variable blocks, the Slot Handle values for each channel is non-zero. The number of multiplexed channels is limited to 65535.

If the Channel Handle metadata is not present in SDTI-PF variable block, then the TLD blocks are considered to be from one channel.

Stream Position Indicator

Local Type value '03h'

Length=1 byte.

The packet stream position indicator is used to identify the position of the following TLD packet in a stream.

Bits b2 to b0 define the position of the following TLD packet in a stream of packets. These 3 bits identify 8 stream states as follows:

0=the TLD packet position in a stream is undefined.

1=the TLD block contains a stream head packet which is any packet which precedes the stream start packet (e.g. pre-roll packets).

2=the TLD block contains a stream start packet which is the first packet of a stream.

3=the TLD block contains a mid-stream packet which is any packet between the stream start and stream end packets.

4 the TLD block contains a stream end packet which is the last packet of a stream.

5 the TLD block contains a stream tail packet which is any packet which follows the stream end packet (e.g. post-roll packets).

6=the TLD block contains both a stream start packet and a stream end packet signifying a stream of length 1.

7=reserved but undefined.

Bits b7 to b3 are reserved but undefined.

TLD Packet Definitions

The following packet types are defined only be the local TLD Type Word.

MPEG-2 Transport Streams

Type value='8xh'

Length=variable depending on the presence and type of embedded FEC together with the presence of User, Count and FEC components.

MPEG-2 Transport Stream (MPEG-2 TS) packets are 188 bytes in length. If Forward Error Correction (FEC) has been added, then the packet length is increased to 204 bytes for DVB emission and 208 bytes for ATSC emission. The MPEG-2 TS FEC may be interleaved across packets and is designed for high levels of data loss through transmission systems which may introduce error bursts. Whilst in extreme cases SDTI can create occasional errors, the MPEG-2 TS FEC is unsuitable for correcting SDTI errors due to the interleave length and this FEC will not exist if the packets carried are only 188 bytes in length. Consequently, the SDTI-PF format includes an optional non-interleaved FEC to correct for any errors which may occur through the SD link.

FIGS. 2*a* to 2*cd* illustrate MPEG-TS packets with different FEC capabilities.

It is permissible for SDTI-PF TS blocks to use all three services, User data, Re-timing and RS-FEC as needed.

SDTI-CP Transmission Packets

Type value='9xh'

Length=variable depending on the presence of User, Count and FEC components.

SDTI-CP Transmission packets adopt a packet structure based on 188 byte MPEG-2 Transport Stream packets and are managed in an identical manner.

Unidirectional Internet Protocol Packets (Uni-IP)

Type value='Axh'

Length=variable up to 65535 bytes.

Because Uni-IP packets can have a length in excess of that capable of being handled by the RS-FEC, Uni-IP packets would not normally be able to use FEC. However, if the Uni-IP packets are constrained by the source device to be less than the limit set for correct FEC operation, then it may be used with success on only those packets which are below 254 bytes in length. Users should also be cautioned that some RS decoders rely on a fixed packet length in order to operate correctly in a pipelined operation. So Uni-IP packets with fluctuating packet lengths may cause decoder problems if the RS-FEC is active.

ATM Cells

Type value='Bxh'

Length=53 bytes.

ATM cells have a fixed length of 53 bytes to which the User, Count and FEC may be added as needed.

Although illustrative embodiments of the invention have been described in detail herein with reference to the accompanying drawings, it is to be understood that the invention is not limited to these precise embodiments, and that various changes and modifications can be effected therein by one skilled in the art without departing from the scope and spirit of the invention as defined by the appended claims.

We claim:

1. An encoder for encoding digital signal transmitted as MPEG-2 transport stream (TS) packets over the Serial Data Transport Interface (SDTI), the encoder comprising:

a clock; and a first means for deriving timing information relating to the digital signal from the clock, wherein the digital signal comprises:

data blocks, each data block including a header containing data relating to the block and a plurality of slots, each slot having a slot header relating to the slot and a data packet, a plurality of data packets containing at least a first part and subsequent parts of the digital signal, a first slot including said first part of the digital signal and a reference time defining a time of production of the first part, and each subsequent slot containing a subsequent part of the digital signal and timing information defining a time of production of said subsequent part relative to the reference time;

said first means deriving from the clock, the reference time defining the time of production of said first part and said timing information defining the times of production of the subsequent parts, wherein said first means is configured to provide the timing information of each data packet relative to other data packets in said plurality of data packets, and wherein a slot coarse count and a slot sub count in said plurality of slots transmitted over the MPEG-2 TS are used to generate the reference time.

2. An encoder according to claim 1, wherein the timing information comprises coarse and fine timing information.

3. An encoder according to claim 2, wherein the clock comprises an input for receiving a clock signal, a modulo n counter which counts the clock signal and divides the clock signal frequency by n to produce the fine time information and a modulo m counter which counts the frequency divided clock signal produced by the modulo n counter, to produce the coarse time information, wherein m is much greater than n.

4. An encoding according to claim 3, wherein the clock signal frequency is 2.25n Mhz, where n is an integer.

5. An encoder according to claim 4, wherein the clock signal frequency is 27 MHz, n is 12 and m is 65536.

6. An encoder according to claim 4, wherein the clock signal frequency is 36 MHz, n is 16 and m is 65536.

7. An encoder according to claim 1, comprising a multiplexer for inserting the time information in the slots.

8. An encoder according to claim 1, further comprising means for inserting into the slot header a flag indicating whether the slot contains said first packet.

9. An encoder according to claim 1, wherein the said data blocks are variable length blocks.

10. An encoder according to claim 9, wherein the said slots are variable length slots.

11. An encoder according to claim 10, wherein the variable length slots comprise slots containing metadata and slots containing data described by the metadata.

12. An encoder according to claim 11, wherein a metadata slot precedes the data slots containing the data described by the metadata in the metadata slot.

13. An encoder according to claim 12, wherein the metadata slot contains metadata identifying a succeeding slot which contains a said first packet.

14. An encoder according to claim 11, wherein the variable length slots comprise a data field, a Type field containing data describing the type of data in the Data field and a Length Field defining the length of the data in the data field.

15. A decoder for decoding a digital signal transmitted as MPEG-2 transport stream (TS) packets over the Serial Data Transport Interface (SDTI), the digital signal comprising data blocks, each data block including a header containing data relating to the block and a plurality of slots, each slot having a slot header relating to the slot and a data packet of a plurality of data packets, the plurality of data packets containing successive parts of information from a source, a first slot which contains a first packet containing a first part of the said information from the source also containing a reference time, and each subsequent slot containing a subsequent packet of the information from the said source also containing timing information defining the timing of that packet relative to the reference time, the decoder comprising:

a clock, first means for detecting the timing information of the plurality of data packets, second means for initially setting the clock to the said reference time on detection of said first packet, third means for comparing the clock time with the said timing information of the subsequent packets, fourth means for outputting the packets at the times when the timing information of the packets equals the clock time, and fifth means for providing timing information of each data packet relative to other data packets in the plurality of data packets, wherein a slot coarse count and a slot sub count in said plurality of slots transmitted over the MPEG-2 TS are used to generate the reference time.

16. A decoder according to claim 15, wherein the timing information comprises coarse and fine timing information.

17. A decoder according to claim 16, wherein the clock comprises an input for receiving a clock signal, a modulo n counter which counts the clock signal and divides the clock signal frequency by n to produce the fine time information and a modulo m counter which counts the frequency divided clock signal produced by the modulo n counter, to produce the coarse time information, wherein m is much greater than n.

18. A decoder according to claim 17, wherein the clock frequency is 2.25 MHz, wherein n is an integer.

19. A decoder according to claim 18, wherein the clock signal frequency is 27 MHz, n is 12 and m is 65536.

20. A decoder according to claim 18, wherein the clock signal frequency is 36 MHz, n is 16 and m is 65536.

21. A decoder according to claim 15, for use with a signal the slot header of which contains a flag indicating whether the slot contains a said first packet, the decoder comprising a demultiplexer for separating the flag and the packet, and means responsive to the flag for setting the clock to the reference time if the flag indicates a first packet.

22. A decoder according to claim 15, wherein the outputting means comprises a FIFO buffer.

23. A digital signal transmitted as MPEG-2 transport stream (TS) packets over the Serial Data Transport Interface (SDTI), the digital signal comprising:

data blocks, each data block including a header containing data relating to the block and at least one slot;

each slot having a slot header relating to the slot and a data packet of a plurality of data packets; the plurality of data packets containing successive parts of information from a source;

a first slot which contains a first packet containing a first part of the said information from the source also containing a reference time; and each subsequent slot containing a subsequent packet of the information from the said source also containing timing information defining the timing of that packet relative to the reference time, wherein each part of said information provides timing information of each data packet relative to other data packets in said plurality of data packets and wherein a slot coarse count and a slot sub count in said plurality of slots transmitted over the MPEG-2 TS are used to generate the reference time.

24. A signal according to claim 23, wherein the timing information of each data packet comprises coarse timing information and fine timing information.

25. A signal according to claim 24, wherein the coarse and fine timing information are represented by separate words in the slot header.

26. A signal according to claim 23, wherein the slot header includes data indicating whether or not the packet is a first packet.

27. A signal according to claim 23, wherein the slot header includes data indicating packet type.

28. A signal according to claim 27, wherein the data indicating packet type indicates one or both of (i) packet length; and (ii) whether the packet includes active error correction data.

29. A signal according to claim 28, wherein each packet includes error correction data.

30. A signal according to claim 29, wherein the slot header includes data indicating whether or not the slot contains error correction data.

31. A signal according to claim 30, wherein each slot contains error correction data.

32. A signal according to claim 23, wherein the slots of each block are of fixed length and have predetermined positions in the block.

33. A signal according to claim 23, wherein the said data blocks are variable length blocks.

34. A signal according to claim 33, wherein the said packets are MPEG 2 TS packets or ATM cells or Internet Protocol Packets.

35. A signal according to claim 33, wherein the said slots are variable length slots.

36. A signal according to claim 35, wherein the variable length slots comprise slots containing metadata and slots containing data described by the metadata.

37. A signal according to claim 36, wherein a metadata slot precedes the data slots containing the data described by the metadata in the metadata slot.

38. A signal according to claim 37, wherein the metadata slot contains metadata identifying a succeeding slot which contains a said first packet.

39. A signal according to claim 35, wherein the variable length slots comprise a data field, a Type field containing data describing the type of data in the Data field and a Length Field defining the length of the data in the data field.

* * * * *